United States Patent Office

2,802,840
Patented Aug. 13, 1957

2,802,840

PROCESS FOR PRODUCING Δ⁴-PREGNENE-11α,21-DIOL-3,20-DIONE

Carl Djerassi, Birmingham, Mich., and Franz Sondheimer, Octavio Mancera and George Rosenkranz, Mexico City, Mexico, assignors to Syntex S. A., Mexico City, Mexico, a corporation of Mexico No Drawing. Application November 6, 1953, Serial No. 390,724

Claims priority, application Mexico November 19, 1952

8 Claims. (Cl. 260—397.45)

The present invention relates to a method for the preparation of cyclopentanophenanthrene derivatives and to certain novel intermediates for the preparation thereof.

More particularly, the present invention relates to a novel method for the preparation of Δ⁴-pregnen-11α,21-diol-3,20-dione (11α-isomer of corticosterone) and/or esters thereof and to certain novel intermediates for the preparation of this cortical hormone.

In the United States application of Djerassi and Rosenkranz, Serial Number 340,898, filed March 6, 1953, now Patent No. 2,735,855, there is disclosed a method for the preparation of Δ⁴-pregnen-11α,21-diol-3,20-dione, a cortical hormone differing from the known cortical hormone, corticosterone, by having an 11α-hydroxy group rather than the 11β-hydroxy group. In the aforementioned application, the described process includes the introduction of a double bond in position 4-5 of a steroid of the allo series, which is a rather difficult and delicate chemical operation.

In accordance with the present invention a novel process has been discovered for the production of the 11α-isomer of the cortical hormone, corticosterone, and/or esters, thereof, which involves reactions with compounds of the C-5 normal series. In other words, in accordance with the present method, the intermediate compounds of the C-5 normal series may be more easily provided with a double bond in position 4-5. There has further been discovered, in accordance with the present invention, certain novel intermediates which are especially suitable for the production of Δ⁴-pregnen-11α,21-diol-3,20-dione and/or esters thereof.

The process of the present invention may be exemplified by the following equation:

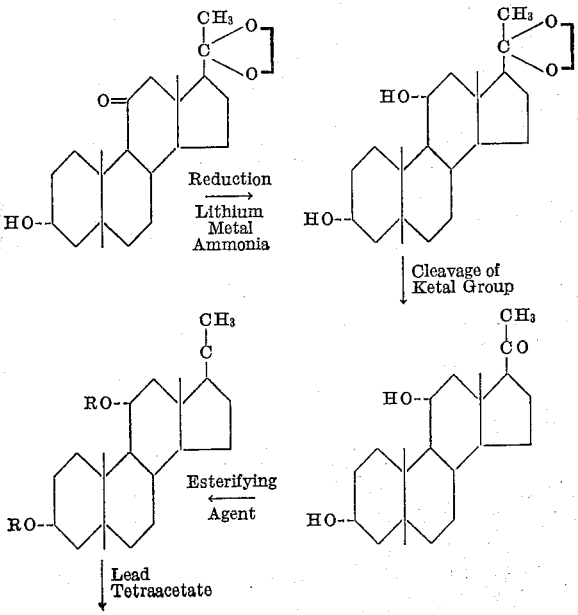

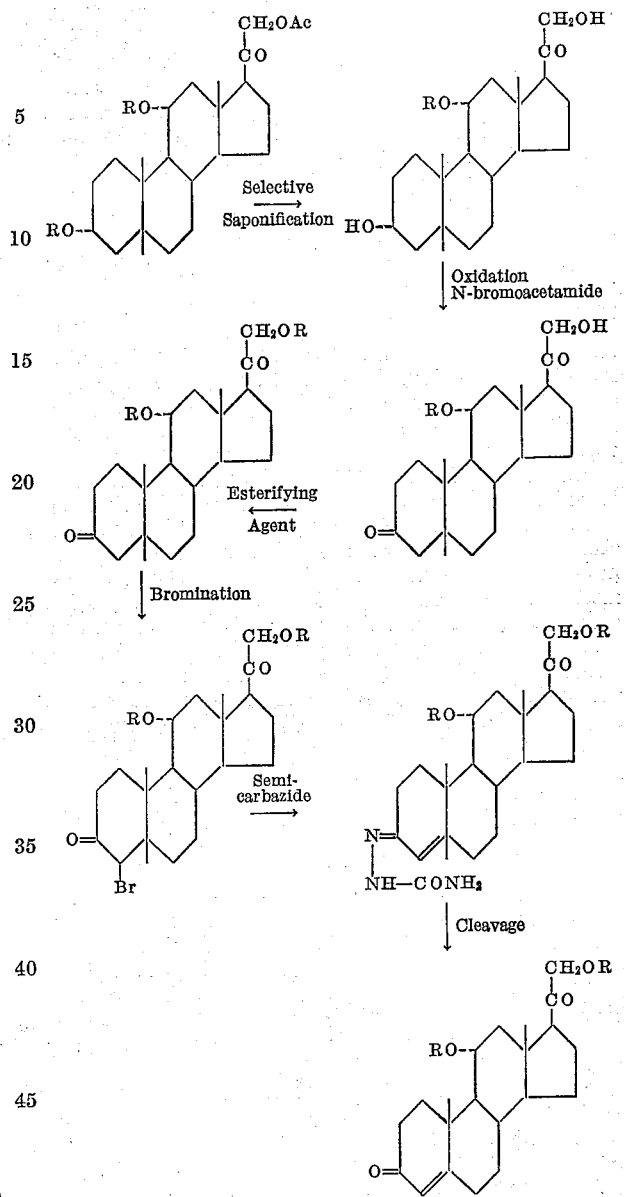

In the above equation, Ac represents the acetyl group. R represents an acyl group derived from the esterification of the free alcohol group, preferably with an acetylating agent, such as acetic anhydride in the presence of pyridine. R may, however, represent any acyl group commonly prepared by the esterification of steroid alcohols with known acylating agents, so that R may represent, for example, a lower fatty acid or benzoic acid acyl group.

In proceeding in accordance with the above equation, the starting material is the 20-ethylene ketal of pregnen-3α-ol-11,20-dione which has been described by Rosenkranz, Pataki and Djerassi, Journal of Organic Chemistry, volume 17, page 291, 1952. The aforementioned ethylene ketal, when dissolved in a suitable solvent such as anhydrous dioxane, may be selectively reduced by lithium metal in liquid ammonia, preferably in the presence of a lower aliphatic alcohol such as methanol. The reduction of this compound selectively produces the corresponding 11α-hydroxy compound. The ketal group may then be cleaved by a suitable cleavage agent, such as p-toluene sulphonic acid to prepare the corresponding pregnan-3α,11α-diol-20-one. This diol is then acylated by treatment with a suitable acylating agent, preferably, a lower fatty acid or benzoic acid acylating agent to prepare the corresponding diacyl compound, as for example, the diacetate.

Upon treatment of the diester of pregnan-3α,11α-diol-20-one with lead tetraacetate, a corresponding triester is formed having in position 21 an acetoxy group. Treatment of the triester thus formed under mild conditions with a saponifying agent, produces a selective saponification in positions 3 and 21 to give the corresponding mono ester of pregnan-3α,11α,21-triol-20-dione having an ester grouping only in position 11, while a more drastic saponification produces, instead, the free triol.

Further treatment of the 11-mono ester of pregnan-3α,11α,21-triol-20-one with a mild oxidizing agent such as N-bromoacetamide produces the corresponding 3-ketone, i. e., the 11-mono ester of pregnan-11α,21-diol-3,20-dione which may then be acylated to the corresponding 11,21-diester with a conventional ecylating agent. In the alternative, the 11-mono ester may be saponified to produce the free pregnan-11α,21-diol-3,20-dione.

The diester of pregnan-11α,21-diol-3,20-dione may be provided with a double bond in the 4–5 position by treatment with one moleucular equivalent of bromine in acetic acid. This treatment forms the corresponding 4-bromo compound which may be dehydrobrominated by means of a suitable dehydrohalogenating agent, as for example, by the formation of the semicarbazone and subsequent cleavage of the formed semicarbazone as indicated in the foregoing equation. The resultant compound is the diester of epicorticosterone (diester of Δ$^4$-pregnen-11α,21-diol-3,20-dione) which may, of course, be converted to the free compound by conventional saponification.

The following specific examples serve to illustrate but are not intended to limit the present invention:

Example I

A solution of 13.8 g. of the 20-mono ethylene ketal of pregnan-3α-ol-11,20-dione in 50 cc. of anhydrous dioxane was slowly added to 1,000 cc. of liquid ammonia containing 70 cc. of methanol and then 7.0 g. of lithium metal was added in small portions in the course of one hour and under continuous stirring. When the blue color of the solution had disappeared, 70 g. of ammonium chloride was slowly added and then the ammonia was evaporated, first at room temperature and at the end heating cautiously on the steam bath. The residue was diluted with water and the precipitate of the 20-ethylene ketal of pregnan-3α,11α-diol-20-one was filtered, to yield 13.7 g. with a melting point of 192°–195° C. The Analytical sample had a melting point of 199°–200° C., $[\alpha]_D -15.7°$ (chloroform).

The hydrolysis of the ketal was effected by dissolving all of the product in 600 cc. of acetone and adding 1.3 g. of p-toluenesulphonic acid. The mixture was kept for 16 hours at room temperature, neutralized with saturated sodium carbonate solution, concentrated to one-third of its original volume and diluted with water. The product was extracted with three portions of 100 cc. of chloroform and the combined chloroform solution was washed with water, dried over sodium sulphate and concentrated. Crystallization from chloroform-hexane afforded 11.79 g. of pregnan-3α,11α-diol-20-one with a melting point of 175°–177° C. The analytical sample had a melting point of 178°–179° C., $[\alpha]_D +87°$ (chloroform).

11.29 g. of the diol was acetylated with 200 cc. of pyridine and 30 cc. of acetic anhydride, heating for one hour on the steam bath. After pouring into water, the precipitate was filtered and well washed with water to give a quantitative yield of the diacetate with a melting point of 138°–141° C. The analytical sample had a melting point of 142°–144° C., $[\alpha]_D +60.8°$ (chloroform).

Example II

A mixture of 6.0 g. of the diacetate of Example I, 200 cc. of pure acetic acid, 3.3 cc. of acetic anhydride and 6.8 g. of lead tetraacetate was maintained for 20 hours at a temperature of 70° C. At the end of this time all of the lead tetraacetate had been consumed and the solution was diluted with water and extracted with chloroform. The chloroform solution was washed with water, sodium carbonate solution and water, dried over sodium sulphate and evaporated to dryness. The residue was crystallized from methanol to yield 3.01 g. of the triacetate of pregnan-3α,11α,21-triol-20-one, having a melting point of 177°–180° C., $[\alpha]_D +79°$. The analytical sample had a melting point of 182°–184° C.

Chromatography of the mother liquors in a column with washed alumina afforded a considerable amount of the unreacted original diacetate.

Example III

A solution of 4.0 g. of potassium hydroxide in a little water and 25 cc. of methanol was added to a solution of 4.5 g. of the triacetate of pregnan-3α,11α,21-triol-20-one in 400 cc. of methanol which had previously been cooled to 5° C. and flushed with nitrogen in order to remove air. The solution was kept at room temperature for one hour and then neutralized with acetic acid, concentrated under vacuum to one-fourth of its volume and diluted with water. The product was extracted with ether, washed with water, dried and evaporated to dryness. Without further purification, the residual oil (mono acetate) was used for the next step.

A solution of 3.77 g. of the above mono acetate in 100 cc. of tertiary butanol and 2.5 cc. of water was treated with 2.66 g. of N-bromoacetamide and the solution was kept for 6 hours at a temperature of 10° C. After diluting with water, the product was extracted with ether, washed with sodium thiosulphate solution and several times with water, dried over sodium sulphate and evaporated to dryness. The residue was crystallized from acetone-hexane, thus giving 1.5 g. of the 11-mono acetate of pregnan-11α,21-diol-3,20-dione, having a melting point of 160°–164° C., $[\alpha]_D +55.5°$ (chloroform). The analytical sample had a melting point of 169°–171° C.

1.5 g. of the 11-mono acetate of pregnan-11α,21-diol-3,20-dione was acetylated with acetic anhydride-pyridine, heating for one hour on the steam bath. The product was isolated by routine procedures and one crystallization from acetone-hexane afforded 0.91 g. of the diacetate of pregnan-11α,21-diol-3,20-dione, having a melting point of 137°–140° C. The analytical sample had a melting point of 140°–142° C.

By more drastic saponification methods, there could be produced both the free pregnan-3α,11α,21-triol-20-one and the free pregnan-11α,21-diol-3,20-dione from the corresponding 11-mono acetate.

Example IV

A solution of 0.79 g. of the diacetate of pregnan-11α,21-diol-3,20-dione obtained in accordance with Example III, in 30 cc. of pure acetic acid, was treated with 0.3 cc. of a of bromine per cc. The solution was then treated dropwise with 3.0 cc. of the same bromine solution to which 155 mg. of anhydrous sodium acetate had been previously added. The mixture was poured into water and the precipitate formed was filtered, well washed with water and dried in a vacuum dessicator. 0.83 g. was obtained of the corresponding 4-bromo derivative.

The bromo derivative was dissolved in 50 cc. of acetic acid and after passing a stream of nitrogen during 10 minutes it was mixed with a solution of 543 mg. of semicarbazide hydrochloride and 400 mg. of anhydrous sodium acetate in 50 cc. of 96% acetic acid. The mixture was kept for 4 hours at room temperature and then treated with an additional 187 mg. of semicarbazide hydrochloride and 133 mg. of sodium acetate dissolved in 10 cc. of 96% acetic acid. The mixture was kept two hours longer at room temperature. The semicarbazone was formed in this way.

The above solution was mixed with a suspension of 2.0 g. of p-hydroxy benzaldehyde and 133 mg. of anhydrous sodium acetate in 40 cc. of water and the mixture was kept for 15 hours at room temperature. At the end of this time the solution was evaporated under vacuum and diluted with water. The product was extracted with ether, washed several times with water and with sodium carbonate solution, dried over sodium sulphate and evaporated to dryness. The residual oil was treated with a little ether and the product crystallized spontaneously on standing overnight to yield 0.46 g. of the diacetate of epi-corticosterone (diacetate of $\Delta^4$-pregnen-11$\alpha$,21-diol-3,20-dione) having a melting point of 142°–144° C. after one recrystallization from acetone-hexane. The analytical sample had a melting point of 144°–141° C., $[\alpha]_D + 160°$ (chloroform).

We claim:

1. A process for the preparation of a diester of $\Delta^4$-pregnen-11$\alpha$,21-diol-20-one selected from the group consisting of lower fatty acid esters and benzoic acid esters which comprises reducing the 20-ethylene ketal of pregnan-3$\alpha$-ol-11,20-dione with lithium metal in liquid ammonia to produce the corresponding 11$\alpha$-hydroxy compound, removing the 20-ketal group by treatment with a cleavage agent, treating the pregnan-3$\alpha$,11$\alpha$-diol-20-one thus produced with an esterifying agent selected from the group consisting of lower fatty acid and benzoic acid esterifying agents to form the 3,11-diester thereof, treating the diester with lead tetraacetate to form the corresponding triester, having a 21-acetoxy group, selectively saponifying the triester to produce the 11-mono ester of pregnan-3$\alpha$,11$\alpha$,21-triol-20-one, oxidizing the 11-mono ester with a mild oxidizing agent to form the 11-mono ester of pregnan-11$\alpha$-21-diol-3,20-dione, treating the last mentioned 11-mono ester with an esterifying agent selected from the group consisting of lower fatty acid and benzoic acid esterifying agents to form the corresponding 11,21-diester, brominating the 11,21-diester to form the corresponding 4-bromo derivative and dehydrobrominating the 4-bromo derivative.

2. The process of claim 1, wherein the dehydrobromination is performed by treating the 4-bromo derivative with semicarbazide to form the semicarbazone followed by cleavage of the semicarbazone with a cleavage agent.

3. The process of claim 1, wherein the cleavage agent is p-hydroxy benzaldehyde.

4. The process of claim 1, wherein the mild oxidizing agent is N-bromoacetamide.

5. A process for the production of pregnan-3$\alpha$,11$\alpha$-diol-20-one which comprises reducing the 20-ethylene ketal of pregnan-3$\alpha$-ol-11,20-dione with lithium metal and thereafter removing the 20-ketal group with a cleavage agent.

6. A process for the production of a diester of pregnan-11$\alpha$,21-diol-3,20-dione selected from the group consisting of lower fatty acid esters and benzoic acid esters which comprises treating a corresponding triester of pregnan-3$\alpha$,11$\alpha$,21-triol-20-one with a saponifying agent capable of selectively saponifying the esterified hydroxy groups at C–3 and C–21 to form the 11-mono ester, treating the 11-mono ester with a mild oxidizing agent to form the 11-mono ester of pregnan-11$\alpha$,21-diol-3,20-dione and thereafter treating the last mentioned compound with an esterifying agent selected from the group consisting of lower fatty acid and benzoic acid esterifying agents.

7. The process of claim 6, wherein the diester is a diacetate, the starting triester has an acetoxy group at least in the 11$\alpha$ position and the esterifying agent is acetic anhydride.

8. The process of claim 6, wherein the mild oxidizing agent is N-bromoacetamide.

References Cited in the file of this patent

UNITED STATES PATENTS 2,440,874    Reichstein _____ May 4, 1948